(12) United States Patent
Hockaday et al.

(10) Patent No.: US 6,544,400 B2
(45) Date of Patent: Apr. 8, 2003

(54) PORTABLE CHEMICAL HYDROGEN HYDRIDE SYSTEM

(75) Inventors: Robert G. Hockaday, Los Alamos, NM (US); Patrick S. Turner, Los Alamos, NM (US); Marc D. DeJohn, Los Alamos, NM (US); Carlos J. Navas, Santa Fe, NM (US); Heathcliff L. Vaz, Los Alamos, NM (US); L. Luke Vazul, Los Alamos, NM (US)

(73) Assignee: Manhattan Scientifics, Inc., Los Alamos, NM (US)

( * ) Notice: Subject to any disclaimer, the term of this patent is extended or adjusted under 35 U.S.C. 154(b) by 72 days.

(21) Appl. No.: 09/821,052

(22) Filed: Mar. 30, 2001

(65) Prior Publication Data

US 2001/0045364 A1 Nov. 29, 2001

Related U.S. Application Data

(60) Provisional application No. 60/193,264, filed on Mar. 30, 2000.

(51) Int. Cl.$^7$ .............................. C25B 1/02; C25B 1/10; C25B 1/12
(52) U.S. Cl. ...................... 205/338; 205/343; 205/637; 205/638; 205/639; 204/252; 204/263; 204/264; 204/265; 204/266; 204/276; 429/40; 429/41; 429/46; 422/129; 422/212; 422/255; 422/305
(58) Field of Search .................................. 204/252, 263, 204/264, 265, 266, 276; 422/129, 212, 255, 305; 429/41, 46, 59, 40; 205/637, 638, 639, 343, 351, 353, 338

(56) References Cited

U.S. PATENT DOCUMENTS

| | | |
|---|---|---|
| 3,133,837 A | 5/1964 | Eidensohn |
| 3,649,360 A | 3/1972 | Bloomfield et al. |
| 4,155,712 A | 5/1979 | Taschek |
| 4,673,624 A | 6/1987 | Hockaday |
| 4,950,371 A * | 8/1990 | McElroy ................. 204/264 |
| 5,242,565 A * | 9/1993 | Winsel ................... 204/265 |
| 5,509,901 A | 4/1996 | Milijasevic |
| 5,599,640 A | 2/1997 | Lee et al. |
| 5,631,099 A | 5/1997 | Hockaday |
| 5,702,491 A | 12/1997 | Long et al. |
| 5,759,712 A | 6/1998 | Hockaday |
| 5,804,329 A | 9/1998 | Amendola |
| 5,997,821 A | 12/1999 | Joshi |

OTHER PUBLICATIONS

Amendola et al.; *A Novel Catalytic Process for Generating Hydrogen Gas from Aqueous Borohydride Solutions*,; Proposed section for "Advances in Hydrogen Energy" to be published by Kluwer Academic/Plenum Publishers (undated).

Derouin et al.; *Recent Achievements in Polymer Electrolyte Fuel Cell R&D*; Proceedings of 1992 Fuel Cell Seminar; Tucson, AZ; pp. 615–618, Nov. 29–Dec. 2, 1992.

* cited by examiner

Primary Examiner—Bruce F. Bell
(74) Attorney, Agent, or Firm—James Creighton Wray; Meera P. Narasimhan

(57) ABSTRACT

A hydrogen source system delivers a controlled fuel stream to applications, using wicking to control the contact between a mixture of $NaBH_4$, $NaOH$ and $H_2O$ and a hydrolyzing catalyst to create a feedback mechanism to automatically maintain a constant pressure production supply of hydrogen. A small compact device packaged for storage, the system operates in any orientation and is mobile. The system is a small portable packaged hydrogen generator for small fuel cells to power applications that are currently powered by batteries. These packaged devices have higher energy per unit mass, higher energy per unit volume, are more convenient for energy users, environmentally less harmful, and less expensive than conventional power sources.

38 Claims, 11 Drawing Sheets

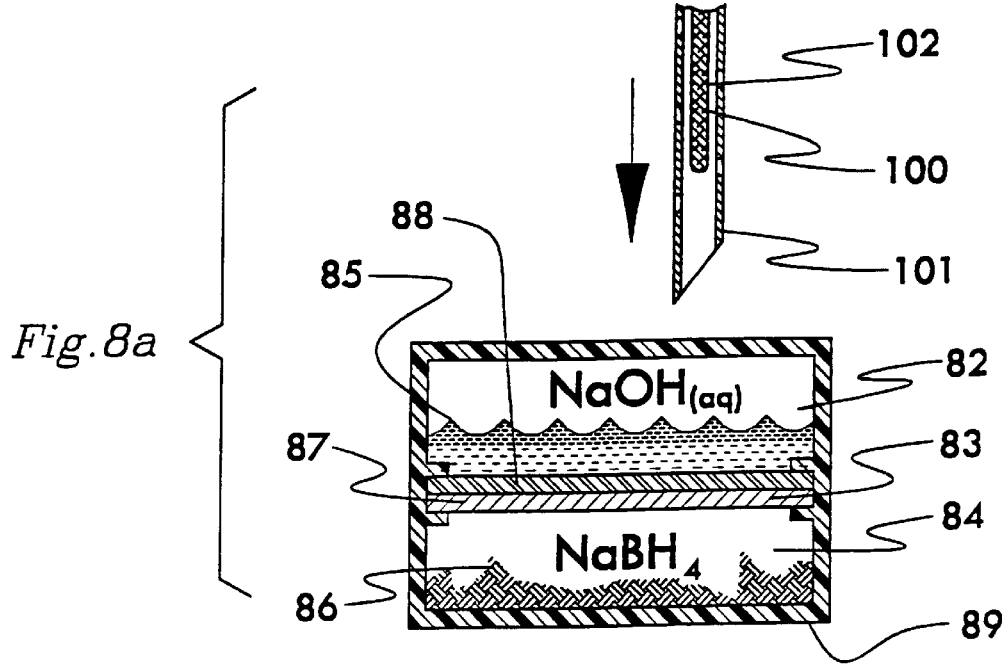
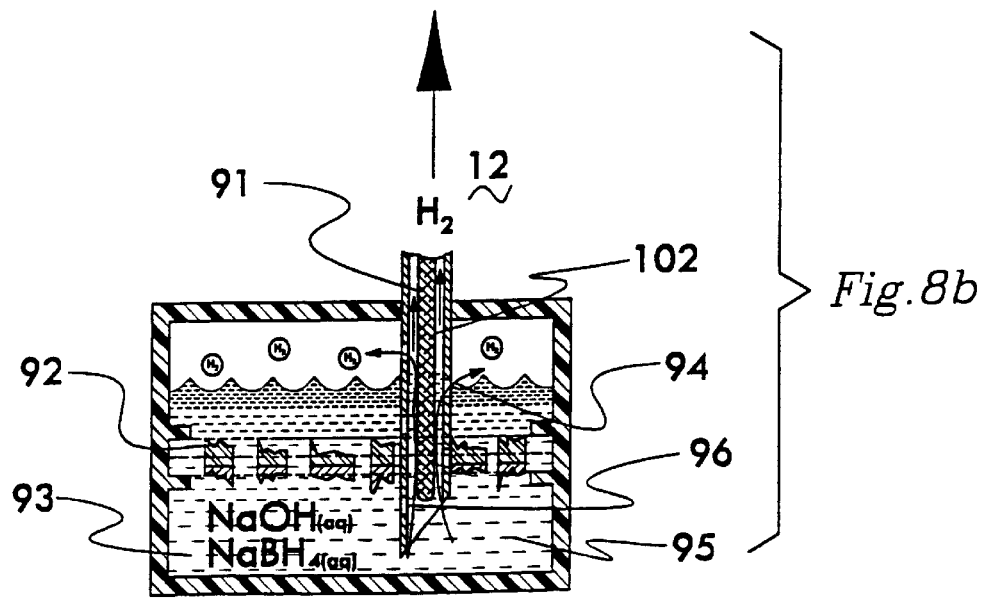

PORTABLE CHEMICAL HYDROGEN HYDRIDE SYSTEM

This application claims the benefit of Provisional Application Ser. No. 60/193,264, filed Mar. 30, 2000.

BACKGROUND OF THE INVENTION

A critical need exists for safe portable hydrogen sources. Fuel cells that transform chemical energy to electrical energy by reacting gas or liquids in the presence of an electrolyte, electrodes and a catalyst, are currently limited in use and performance by the fuel supply.

Our previous patents, U.S. Pat. No. 4,673,624 "Fuel Cell" and U.S. Pat. No. 5,631,099 "Surface Replica Fuel Cell, and U.S. Pat. No. 5,759,712 "Surface Replica Fuel Cell for Micro Fuel Cell Electrical Power Pack", described a method of forming a fuel cell that efficiently utilizes expensive catalysts, is easily mass produced, and is packaged for portable electronics. When fuel cells can utilize hydrogen as the fuel they can obtain superb power performances. There are many other applications that would benefit from a safe portable pure source of hydrogen; these include jewelry-welding torches, miniature-welding torches. A co-pending patent application, U.S. Ser. No. 09/208,745, describes how the MICRO-FUEL CELL™ can be packaged in portable electronics. A co-pending patent application U.S. Ser. No. 09/210,792 describes how the non-bipolar fuel cells can be packaged to form larger power supplies.

Hydrogen generators have been explored by Millennium Cell (1 Industrial Way West, Eatontown, N.J. 07724). They use pumping of $NaBH_4+H_2O+NaOH$ solutions, hereafter referred to as "fuel" throughout this document, on contact with Ru catalytic surfaces to produce hydrogen and sodium borate by hydrolysis. They also use electrically heated catalytic surfaces and control mechanisms for production of hydrogen from the fuel. The principal concept is that these techniques work well with large-scale systems, but are unsuitable for small devices where active systems are cost and size prohibitive. Also, the larger systems use gravitational orientation to function, while small and portable systems often need to work in any position.

An advance in hydrogen sources is described in U.S. Pat. No. 5,804,329 utilizing a process of hydrolyzing a mixture of $NaBH_4$, NaOH and $H_2O$ in contact with a cobalt catalyst by acidifying the solution. Other systems are described in U.S. Pat. No. 3,133,837 and U.S. Pat. No. 3,649,360 to extract hydrogen from chemical hydrides such as calcium hydride, lithium hydride, magnesium hydride, and sodium hydride meter-out water to the hydrides and produce hydrogen. The particular problem with simply making hydrogen by a controlled mixture is that the reaction is typically highly exothermic and can proceed violently, or form intermediate compounds. The general experience with these sources is that they can be unsteady or require active control systems.

The process described in U.S. Pat. No. 5,804,329 utilizes a base such as NaOH dissolved in water to stabilize the dissolved $NaBH_4$. The highly basic environment inhibits the spontaneous hydrogen evolution from $NaBH_4$ dissolved in water. When the solution makes contact with a catalyst such as cobalt or ruthenium, or is acidified, hydrogen is evolved at a steady regular rate. Thus, the basic mechanism for a controllable hydrogen source is in place if the contact between the catalyst and the solution is controlled. One focus of the present invention is to build a small portable packaged system that has this control mechanism based on consumption feedback.

Applications for this hydrogen source to provide hydrogen to small fuel cells for power applications include devices that are currently powered by batteries, especially rechargeable batteries. The present invention addresses a host of problems existing in the art.

Related Art

U.S. Pat. No. 3,133,837 uses closed circulation of produced hydrogen to circulate water from the fuel cell to the metal hydride supply to generate more hydrogen. This system is started by an injection of water into the metal hydride supply. Water vapor recovery from the fuel cell is necessary to maintain the performance of this system. Regulation of the hydrogen production in this system is by hydrogen pressure controlling the flow rate of a hydrogen circulation pump. The diffusion time of water to the active decomposition sites causes a delay time in the production, and a subsequent overshoot response. Most of the metal hydride/water decompositions are highly exothermic which can lead to unstable hydrogen production. This system is considered too complex to be used in small portable hydrogen supplies.

U.S. Pat. No. 3,649,360 uses a pressure-controlled interface in a wicking system to deliver water in a pressure-regulated manner to hydrides that decompose to generate hydrogen. In addition, they also describe a membrane separation between the reactants before use as a method of storing the generator. Regulating the water to metal hydrides has been found to be difficult. The diffusion time of water to the active decomposition sites causes a delay time in the production, and a subsequent overshoot response. Most of the metal hydride/water decompositions are highly exothermic which can lead to unstable hydrogen production. A key problem is that the exothermic output increases the decomposition rate and steam production, which in turn involves more of the metal hydride in production. These two effects accelerate and amplify the hydrogen production overshoot and can lead to over-pressurization and explosions.

U.S. Pat. No. 5,702,491 uses the heating of chemical hydrides to generate hydrogen on demand in a portable generator. This thermally regulated and insulated hydrogen generator may have a time response insufficiently fast for small portable devices. The insulation of the generator can keep it from being dense enough to result in a high energy per unit volume needed in small portable devices. If the insulation is made thin and compact, the device will take a large fraction of the output power to run, resulting in low system efficiency.

U.S. Pat. No. 5,509,901 illustrates a pressure responsive device to deliver fluids. A mechanical pressure device such as this could deliver fuel to catalytic reactor. But this system appears to be a very complex mechanical scheme that could be expensive to manufacture, take up a large fraction of the generators volume, and lead to a lower energy per unit volume.

U.S. Pat. No. 5,997,821 presents a gas amplifier device that uses electrochemical generation of gas as the control mechanism. The generated gas is amplified by a mechanical member making contact with chemical reactants to produce product gas with much greater volume than the initiating gas production. The gas production is used to pressurize a fluid and deliver a controlled amount of a liquid or gas, such as medical fluids, fragrances, insecticides, hydrogen, and lubricants. This system depends on an electrical power input to run. Thus without an initiating source of electricity it would not be self-starting. If this device were used to generate hydrogen gas for a device that needs a constant pressure supply of hydrogen, there would need to be an additional coupling between the hydrogen pressure and the electrical input into the electrochemical cell. This may be error prone and expensive for small portable hydrogen generators.

U.S. Pat. No. 5,599,640 describes an alkaline fuel cell that uses $NaBH_4$, $KBH_4$, $LiAlH_4$, KH, NaH, and other hydrides in an alkaline electrolyte (NaOH or KOH) to generate hydrogen. Some of the generated hydrogen is stored in Misch metal hydride alloys such as zirconium alloyed with Mn, Co, Ni, and Al in the anode. The electrolyte of the fuel cell is in common with the alkaline electrolyte and products of the fuel supply. The buildup of products in the fuel supply interferes with the operation of the fuel cell. The alkaline fuel cell if using air as the source of oxygen will absorb carbon dioxide from the atmosphere. Absorption of water in the alkaline electrolyte can cause insoluble precipitates to form inside the electrodes and interfere with the operation of the fuel cell. The position of the electrolyte: In the fuel cell, and critically the oxygen electrode, can be affected by the pressure of the hydrogen and the ion drag driving the electrolyte away from the oxygen electrode. This patent does not describe how the device could be used in different orientations or how to stop hydrogen generation when there is no need for the electric power.

The hydrolysis reactors using Ru catalysts researched by Millennium Cell have demonstrated the controlled generation with a high specific energy per unit mass out of $NaBH_4+H_2O+NaOH$ solutions (Advances in Hydrogen Energy, Kluwer Academic/Plenum Publishers). They have a variety of reactor systems. The mechanical method of pumping the fuel to the catalytic Ru surfaces is mechanically complex for small portable applications. The method of a U-shaped fuel tank with one side having a catalytic surface and the other side pressurized and sealed, or vented to the atmosphere, depends on gravity to keep the fuel in the bottom of the U. If the tank is tilted near or beyond horizontal it would fail to regulate production, making it unsuitable for portable applications. Millennium Cell has explored Ru coated exchange resin beads as the catalytic surfaces and electroplated metal surfaces. Both of these have surface areas limited to the external surface area of the object. Millennium Cell has also explored pumping the fuel directly into an alkaline fuel cell and obtained performances comparable to the state of the art for alkaline fuel cells. A particular problem of direct fueling is that if the output of the cell is not utilized, the production of hydrogen will continue in the fuel cell and since the fuel is the same as the electrolyte it can flow through the fuel cell and flood the air electrode.

Millennium Cell has also explored using electrical resistance heating of the catalytic surfaces to accelerate the hydrolysis on the catalytic surfaces when they are cold. Once the reaction started the hydrolysis production generated sufficient heat to keep the reaction at the desired rate in their larger reactors.

SUMMARY OF THE INVENTION

This invention relates to a hydrogen source system that delivers a controlled hydrogen stream to portable applications. A major feature of this design is a feedback mechanism to automatically maintain a constant pressure supply of hydrogen or constant hydrogen flow rate. The particular safety features are: to automatically produce hydrogen to match the consumption, the ability to be formed into a small compact device, the ability to operate in any orientation, and to be portable. One of the major objectives of this device is to fuel a MICRO-FUEL CELL™ described in U.S. Pat. No. 5,631,099 and U.S. Pat. No. 5,759,712.

This hydrogen source fuel cell package may have higher energy per unit mass, higher energy per unit volume, be more convenient for the energy user, environmentally less harmful, safer than the high performance batteries and less expensive than conventional batteries. Expected specific energy performance levels are between 600 to 6000 Watt*hr/kg.

New Catalytic Surfaces

Several features of our catalytic surfaces are to use sputter deposited surfaces or other porous metal coatings on dielectric substrates such as porous polypropylene, polyethylene, spun high density polyethylene (TYVEK™ DuPont), PBI polybenzimidazole plastic, PBO poly(p-phenylene-2,6-benzo-bisoxazole), porous PVDF polyvinylidene fluoride, porous PTFE (TEFLON™, Du Pont, Wilmington, Del. 19898), polytetrafluroethylene, porous acrylonitrile polymers, acrylonitrile polymers filter paper (VERSAPORE™), and porous PVC polyvinyl chloride plastic. Other substrates are porous metals or non-porous metals.

The catalyst deposits, such as ruthenium, are electroplated or vacuum coated over these substrates. These catalyst coatings may be deposited by high or low pressure sputtering. Electroplating over metals or metalized dielectric surfaces may be used to produce high surface areas and adherent films. Particular features of deposits are to make the deposit on the interior of capillary pores. One method is to deposit on the interior of capillary pores. Another method is to deposit onto a wire and then insert the wire into the reaction pore. In the small planar pore system the catalyst deposits may be selectively deposited by vapor deposition and geometrical shading to produce a deposit that only goes partially down the pores. This gives the pore a progressive catalytic performance as the fuel moves further into the pore.

New Hydrogen Barrier Layer Fuel Cell Integrated With Hydrogen

By using the fuel cells described in U.S. Pat. Nos. 5,631,099 and 5,759712, their hydrogen selectively permeable electrodes may be used with the fuel supply in direct contact with the fuel cell. The new features that are added by using the approach are that:

1. The selective permeable electrode acts as a barrier to prevent water loss through the cell via osmotic drag. It also keeps the position of the electrolyte more constant in the fuel cell electrodes. Thus, alkaline electrolytes, such as NaOH, may be used with the fuel cell and the problem of flooding the oxidizer electrode or fuel electrode is prevented. Solid polymer electrolytes may be used on the air electrode to immobilize the electrolyte catalyst interface.

2. Two different electrolytes such as an alkaline solution in the fuel electrode and an acid on the air electrode may be used to prevent carbonate formation on the air electrode. To optimize the air electrode kinetics, such as with silver catalyst, but make it more resistant to carbonate formations an electrolyte such as $Cs_2CO_3$ may be used. Additives to the air electrode that may be too expensive or incompatible with the fuel may be placed in the air electrode. A variety of combinations of different electrolytes on either side may be used by virtue of having an electrolyte-separating barrier.

3. Simple fuel and hydrogen leakage through the electrolyte may be prevented by having the hydrogen-only barrier layer.

4. By separating the fuel from the fuel cell electrolyte, interference from break down products such as $B_2O_4$ and $NaBO_2$ of may be prevented.

Low Cost Fuel/Gas Separation

There are several ways to remove carry over water out of the hydrogen product stream from the reactor. The first level of filtration is to have a matrix small pore filter that simply prevents bubbles and traps particulates from going through the gas flow. The next problem, that the matrix filter does not solve, is that the produced hydrogen may be carrying too much water vapor and removing it from the fuel and depositing it in the fuel cell. A typical solution to this problem in larger systems would be a cooled condensation filter and recycling. This is impractical in small devices. Other techniques are to bubble the hydrogen production gas through a buffering solution to take out particulate salts and remove moisture. Other dehumidifying methods such as flowing through silica gel may be used but are considered excessive in mass and complexity for small devices. A hydrogen-only permeable supported metal membrane or foil, such as Pd/Ag alloy may be used to filter the produced hydrogen. Other solutions are to use non-metallic membranes that are more permeable to hydrogen gas than water, such as silicon rubber membranes, to filter the produced hydrogen and limit the water vapor to a desired ratio.

Hydrogen Barrier Layer Filter

The separation of the fuel and the produced hydrogen may be accomplished by bubbles breaking up and the liquid settling away from the gas in a larger volume than the reactant pores. A porous hydrophobic membrane may also filter entrained liquid from the hydrogen steam. As a third stage a hydrogen-only permeable membrane that permits the hydrogen to come through and block water vapor and fuel may be used. This membrane may be made of metal permeable to hydrogen such as a transition metal film with catalytically active exterior surfaces. An example is Pd, or Pd/Ag alloys, or layered films with surface catalysts that may maintain catalytic performance to speed the entry into the metal film such as Pt, and alloys such as Pt/Ru, Pt/Sn and Pt/Ag. Pt/Ru and Pt/Sn are alloys that maintains performance in the presence of poisons such as carbon monoxide. The metal film may be formed on a porous substrate such that the metal film covers the pores of the substrate. Suitable substrates are etched nuclear particle track plastic membranes such as polypropylene. Other suggested fine pore substrate materials are: PBO poly(p-phenylene-2,6-benzobisoxazole), PVDF polyvinylidene fluoride. Membranes that are permeable to hydrogen, while blocking liquid or vaporous water, such as silicone rubber may also be used. A thin wetted porous membrane may be used with hydrogen diffusing through with the liquids simply staying on the membrane.

Capillary Wick Pressure Control

A critical feature in the small hydrogen source is making the source so that it operates in any position and still achieve pressure regulation and fuel circulation. To do this there are two mechanisms of surface tension (surface energy) that may be used. The first is that surfaces with high surface energy retain a liquid (wet). The second feature is that surfaces with low surface energy repel the liquid contact. If a surface is created that has small capillary surfaces such as pores or hairs, this wetting or repellence is enhanced. Examples of wetting are the rapid absorption of water into cotton fabrics or paper towels. Examples of repellence are observed in the way water beads roll off strawberry leaves or lotus flowers.

Using this combination of wetting and repellent surfaces, the $NaBH_4+H_2O$ NaOH (fuel) may be held in a hydrophilic, matrix while the produced hydrogen gas may be filtered from the fuel and held in a hydrophobic matrix. This also leads to the principle of capillary pressure; i.e. the pressure that is required to force a liquid out of hydrophobic pores or into hydrophilic pores.

The capillary pressure is defined as $$P_c = \gamma_{sl}/r$$

where "$\gamma_{sl}$" is the surface tension energy between the surface and the liquid, and "r" is the pore radius.

By using this property/feature of wetting versus repellence or surface energy and an appropriate geometry, a pump may be created that uses capillary pressure. If a hydrophilic pore has a cone geometry or a gradient in the surface tension energy and if bubbles are in this pore, as will be generated in the pore coated with a hydrogenation catalyst, there is a pressure on the bubble defined by the difference in capillary pressure due to the bubble making contact with two different pore radii. In the hydrophilic situation the differential capillary pressure on the bubble pushes toward the larger radius end of the pore. In the hydrophobic case it pushes the bubble toward the smaller radius end.

During hydrogen generation on the catalysts the bubbles form at nucleation sites, coalesce to make contact with the pore wall and are then driven out by the differential capillary pressure. The pore may also entrain liquid fuel as the bubble pushes out of the pore leading to a fuel pumping action. This effect may then be used to pump the fuel through the catalyst-coated pores and return it to the source supply to circulate the fuel.

If the gradient is steep enough it is able to counteract pressures across the two ends of the capillary pore either by gravity column pressure of the liquid in the pore or static pressure between the two ends of the pore. Thus, short tapered hydrophilic pores with hydrogen bubble production in the pores pumps fuel against the effects of gravity.

This action of wicking liquid fuel into a pore and then bubble entrapment leads to pumping the fuel through the catalyst coated pores and returning it to the fuel tank. The cutoff of hydrogen production is achieved by the hydrogen produced displacing the fuel from the catalytic surface. This displacement may be achieved by the produced hydrogen pressure pushing the liquid fuel back up the capillary pores or reactor tube, with the fuel supply having some pressure communication to the outside ambient pressure. Another mechanism may be an increase in hydrogen gas pressure above the surrounding ambient pressure causing the fuel supply to cut-off the supply of fuel to the capillary wicks or reactant catalysts. There are two methods of drawing fuel back to the fuel tank. The first is for the fuel tank to be filled with an impregnated elastic matrix. When the pressure is raised, the fuel tank expands and the matrix volume is increased permitting fuel to be drawn into the matrix away from the reactor area. When the pressure is low, the tank contracts down onto the matrix material "squeezing" the fuel into the larger pore diameter pores and catalytic surfaces. The small capillary material may be located on the interior of the tank or on the walls of the tank. In the case of the capillary material located on the walls the produced hydrogen forms a hydrogen bubble around the reactor. In the second method the capillary material is located around the reactor. The interior of the reactor catalytic surfaces dry out as the hydrogen bubble forms along the walls of the reactor. In this case the fuel tank is vented or incorporates pressure communication to the ambient pressure and the fuel and capillary pores are between the produced hydrogen gas and the outside vent. As the pressure of the produced hydrogen is increased there is a differential pressure across the capillary wick and the fuel is "pressed" down the reactor pore against the capillary pressure, thus removing the fuel from the catalyst and shutting off the hydrogen generation. When the hydrogen pressure is low, the fuel is drawn back into the catalyst-coated pores and the hydrogen generation resumes. In both methods when hydrogen generation is occurring, fuel entrapment and "percolation" pumps and circulates the fuel.

Capillary Pressure Gradient Versus Hydrostatic Pressure

The capillary pressure is $$P_c = \gamma_{sl}/r$$

where "$\gamma_{sl}$" is the surface tension energy between the solid and the liquid, and "r" is the radius of the pore.

In the situation where we have a pore with an entrance pore radius of "$r_1$" and exit radius of "$r_2$" then a maximum capillary differential pressure across this pore if there is a bubble in the pore is:

$$\Delta P_c = \gamma_{sl}/r1 - \gamma_{sl}/r2$$

The maximum hydrostatic pressure of a column of water in a pore is $$P_{ht} = g*\rho*l$$

where "g" is the acceleration of gravity, "$\rho$" is the density of the fuel and "l" is the length of the pore filled with liquid. An additional hydrostatic pressure due to the column of fuel in the tank may be expressed as $$P_{ht} = g*\rho*l_t$$

where "$l_t$" is the tank depth.

The third hydrostatic pressure is due to the difference in pressure between the supply gas stream and the ambient atmospheric pressure.

The dynamics of this pressure situation is that when the pore has small bubbles in it that do not touch the walls there may be no differential pressure gradient. When the bubble coalesces it touches both sides of the walls and start to be influenced by the gradient pressure that builds up as the bubble further fills the pore. The gravitational hydrostatic pressure starts at a maximum when the pore is filled with liquid. Thus, it is an unstable system, which builds up a bubble being produced by the reaction of the catalyst and the fuel. This process increases gradient pressure until it exceeds that of the hydrostatic pressure and flow occurs with liquid entrained with the bubble. This gives rise to a percolation effect of gas pumping the liquid through the pore.

The critical calculation to make this percolator independent of gravity is to calculate when the gradient pressure cannot exceed the hydrostatic pressure of the fuel tank or externally applied pressure. This may be achieved by setting the hydrostatic pressure equal to the capillary differential pressure in the reactor cone:

$$P_h = g*\rho*l_t = \gamma_{sl}/r_1 - \gamma_{sl}/r_2$$

This equation points out several important features. It is expected that if the gradient pressure cannot exceed the hydrostatic pressure the reactor cannot percolate and the pumping of the fuel stops. This is the cutoff mechanism, or the bubbles may not preferentially leave the more open end of the cone reactor and there is no circulation pumping. The failure can occur when: the tank is deep, there are large pores with a low surface tension energy, there are very small differences in the pore radius differences, or small differences in the surface tension energy gradient across the pore.

Another problem is making sure the fuel reservoir capillary matrix has small enough pores and surface tension energy to retain the fuel against hydrostatic pressures. If it is an elastic matrix it needs to be able to retain the fuel though the range of expansion and contraction. The ideal matrix also has large enough pore radius to maximize the rate at which fuel may circulate through it. With smaller pores there is an increased drag on circulation. The device may be designed around an elastic storage tank. Bubble filling may be used as the device uses up fuel. Thus, deeper in the fuel matrix there may be low capillary pressure areas that preferentially fill up with gas.

The wetting of the capillary tube determines the maximum pressure of the capillary reactor. In the insertion tube design, the capillary pressure difference between the insertion tube reactor surfaces and a tightly surrounding matrix material may be sufficient to maintain the desired dynamic equilibrium. Thus, the remaining volume in the fuel tank may be free flowing fluid and gas.

Wetting of pores and capillary pressure may also be used like a pressure valve and seal. The vented fuel tanks may have a wetted porous membrane surrounded by two hydrophobic porous membranes. When the capillary pressure is exceeded the gas pushes through the wetted pores and the venting may occur at a slow rate through the small pores. When the pressure drops below the capillary pressure the liquid refills the pores and reseals the vent.

Diverging Tube Liquid Gas Pumping (The Bubble Pump)

The capillary pressure of a pore is inversely proportional to the diameter of the pore. Thus, if a pore diameter is varied as in a cone or in a layer of increasing pore diameters or surface tension energy gradient, there is a capillary "drive" pressure in the pores if there is a bubble touching the walls and makes contact with the two different pore diameters. In the zone inside catalytic reaction areas, hydrogen bubbles are created and once they coalesce to the size of bubbles that may touch the sides of the pores they experience this surface tension drive. This mechanism may be used as the percolation pump of fuel by moving the entrained fuel through the pores in one direction.

Hydride Absorber for Excess Production

A hydrogen absorbing material such as a metal hydride membrane or mass may be used as a filter and as a hydrogen reservoir to make the hydrogen source more stable supply. The metal hydride may also be the electrode of a battery such as the nickel metal hydride battery.

Hydrophobic/hydrophilic Gas Liquid Separation

Hydrogen generation from the liquid fuel results in entrained liquids in the product stream. Several methods may be used to separate the hydrogen from the liquids. The first method is to simply let the cavity be large enough for the bubbles to coalesce and separate by gravity density separation. Another method beyond this is to have the fluid drain off into a hydrophilic sponge or capillary wall liner. The third method is to create a small pore diameter hydrophobic membrane, a small pore diameter hydrophilic membrane, and place the gas liquid mixture in between. The liquid is preferentially be drawn off into the hydrophilic material and the hydrogen gas preferentially into the hydrophobic material.

Fuel Filtration; Separation of Entrained Liquid and Hydrogen, Separation of Moisture from the Hydrogen In the return flow of the fuel to the reservoir there may be a capillary filter in the flow that may capture catalytic particles that may have inadvertently come off the reactor surfaces. This prevents them from generating hydrogen within the fuel reservoir and may also be cut off when the hydrogen pressure drives the fuel further down the capillary exit. By simply cutting off the circulation of the fuel, it will be depleted and the generation of hydrogen gradually cutoff.

Mixed Fuel Systems and Interaction Effects

The fuel solution may have a variety of other solvents besides water. In the U.S. Pat. No. 5,804,329 other solvents such as methanol are mentioned. A fuel mixture of $NaBH_4$, methanol, a base and water may be an effective fuel. Improvements to the fuel may be realized by having a variety of different additives in the fuel to vary the properties such as: surface tension wetting properties, increase the energy per unit mass, increasing or decreasing the surface catalyst reaction rates. This mixture may also be a source of other fuels, such as methanol, along with hydrogen in the output. The alkaline fuel may be a sink for carbon dioxide by forming carbonates. As an example of other fuels that work in this invention is a hydrazine and water mixture. It is very soluble in water and decomposes to produce hydrogen and nitrogen on contact with solid catalysts.

Mechanical Regulation of the Hydrolysis Reaction

A scheme to regulate the contact between the fuel and the catalyst or fuel cell may be accomplished by using a diaphragm, piston, or bellows to achieve the pressure proportional mechanical motion. An embodiment of this concept is to have piston or bellows containing the hydrogen product attached through a rod or plate that is coated with Ru catalyst. The fuel is contained in a tank either by gravity, a seal or a saturated wick. When the hydrogen pressure is low the bellows or piston are spring loaded to contract and push the reactant-coated rod or plate into the fuel and generate hydrogen. When the pressure is high the piston or bellows expands and pulls the catalyst coated rod or plate away from the fuel. The wicking material itself may be designed to percolate when in contact with the catalytic surface permitting the wicked fuel to circulate. In this case the small diameter pores or highest capillary pressure wick surfaces make contact with the catalyst. This also may have the feature that as the fuel supply is used it migrates toward contact with the catalyst reaction surface and maintain performance.

Fuel Pumping Regulation of Reaction

A scheme to regulate the hydrolysis reaction is to regulate the delivery of fuel to the catalytic surfaces. One method is a two-chamber system that pressurizes the reactants in a bladder with respect to the catalyst reaction chamber and then pressure regulates the fuel delivery. The pressure regulation may be done through the pressure on the overall case leading to a mechanical linkage to proportionately reduce the fuel flow proportional to the hydrogen pressure. A wicking material may be used in the catalyst reaction chamber to achieve the high surface area and absorption of reaction products to allow the separation of liquids products and hydrogen. As the wicking material absorbs liquid products it may also expand and absorb further products. Water absorbing material such as cross-linked polyacylamide (absorbs 400 times it's weight of water) may also be used to absorb the products and maintain the differential pressure on the fuel bladder. The absorbing material may also act to neutralize the products by acidifying to make the spent cartridge non-caustic. This neutralization also scavenges any remaining hydrogen production out of the fuel.

In one arrangement the fuel bladder and the reaction chamber are separated by an elastic membrane. The reaction chamber is loaded with an elastic wicking material that presses on the separating boundary, thus elevating the pressure of the fuel bladder. Another mechanism of pressurizing the fuel bladder is from the low-level hydrogen production from the fuel. A wicking material may be used in the fuel bladder at the entrance to the fuel delivery route so that only fuel is drawn in. If excess hydrogen buildup occurs in the fuel bladder a gaseous hydrogen vent route may be provided that has a hydrophobic entrance to vent only gas when the pressure buildup is too high. A mechanism of having an alternating hydrophobic or hydrophilic interior coated capillary vent tube, between the fuel bladder and reaction chamber, may be used on the vent route to act as a threshold pressure valve if an excess gas or liquid pressure build up occurs. Another pressure relief is a flap valve that opens to the reactant chamber when the differential pressure in the bladder exceeds that of a set value. On the fuel delivery route the simplest embodiment of the pressure proportional closing valve is to have an elastic hose connection between the fuel bladder and the reaction chamber that is proportionately constricted by the pressure of hydrogen in the reaction chamber. There are many ways of incorporating the fuel bladder, pressure regulated fuel delivery route, hydrogen vent route, catalyst chamber, catalyst surfaces, and liquid gas separation.

Electrical Heating of Catalyst

The catalyst surfaces may be configured to also be electrical conductors by having the catalyst deposited over wires or thin film catalyst deposited on an insulating substrate to form an electrical conduction path. If these conductors have an electrical current driven through them they heat up and subsequently increase the hydrogen output. Another description of this device may be called a temperature compensator. This mechanism may be incorporated into the hydrogen generator by electrically connecting the catalyst circuit to the output of the fuel cell and a shunting circuit. The shunting circuit diverts electrical current to the catalytic surfaces when the voltage and current conditions in the fuel cell indicate insufficient fuel supply. When voltage and current are sufficient the shunting circuit will not divert any current to the catalytic surfaces. This shunting circuit may have a proportional response to the required need to increase the fuel supply to the load above the baseline output without the catalysts being heated.

A heated catalyst on a filament may be used like an initiator of hydrolization in catalyst coated divergent tube to start percolation and subsequent hydrolization.

Safety Features

Critical problem of the $NaBH_4$ based source is being able to turn off the production of hydrogen when it is not needed. Venting excess hydrogen without combustion or explosive breach is also needed. Storage of the reactants indefinitely is also needed.

The cut off hydrogen production may be done in several ways. The simplest is to have a metering pump such that when hydrogen production needs to be stopped, it is reversed and halted to draw the fuel away and keep the catalytic reaction surfaces dry. Beyond all the methods of pressure-regulated production of hydrogen, as previously described, a valve may be inserted between the fuel supply and catalytic reaction surfaces. Pumps may also be used with the inlet of the pumps located within the fuel-absorbing wick to make the pump effective in any position. A pump may be used to deliver fuel to the catalyst and also remove fuel from the catalyst. These fuel wicks may be located in the reservoir and the de-bubbling portions of the hydrogen generator.

Venting may be done with small liquid filled pores. The maximum pressure the pore will vent at is determined by the capillary pressure in the pore.

Excess hydrogen may be generated if there is a sudden change in the hydrogen consumption. The catalyst is uncovered as hydrogen pressure builds up but fuel that wets the catalyst continues producing hydrogen until fully depleted. Thus, a pressure relief such as a flap valve that reseals or have container walls that are highly permeable to hydrogen are solutions. The highly permeable container walls act as an outer container such that if a bubble of hydrogen makes it to the outer walls it diffuses out harmlessly by spreading the hydrogen concentration below the flammability levels.

High-pressure relief valves may be placed on the fuel tank and in the application. The simplest of designs is a flap of silicon rubber over a hole that makes a seal to a smooth surface of the case of the tank. When the pressure is high enough the flap opens and the excess hydrogen gas vents out and the flap reseals.

If the hydrogen exit is blocked with fuel it may pressurize and drive the caustic fuel out of the hydrogen exit and contaminate the end user. By placing porous hydrophilic, hydrophobic separation filters, and return routes this may be prevented from occurring. The pressure flap on the tank may also prevent bursting of the tank.

The $NaBH_4+H_2O+NaOH$ solution "fuel" has a tendency to decompose to hydrogen gradually. A solution for long-term storage is to pack the $NaBH_4$ dry and separate it from the solution of NaOH and water, then mix the two ingredients when needed. This then leads to the concept of packaging these two components in a membrane-separated package such that when the membrane is broken with the catalytic reactor, it starts up and the fuel mixes. The separator membrane may be made of a material or support structure that dissolves or breaks apart when the breach occurs. Ideas for this are a polycarbonate membrane (etchable in bases) on the $NaBH_4$ side and thin non-etchable coating such as polyethylene. Metal foils with inert coatings such as aluminum with aluminum oxide or plastics may be used. The circulation of the fuel may fully mix the reactants as the system runs.

Product Cost Through Better Fuel Cell Optimization

A new development is that high catalyst utilization techniques used for fuel cells may be incorporated with the hydrogen generator to make economical electrical generators. On Feb. 28, 1985 Robert Hockaday achieved 1.9±1.2 kW/gm (full cell) of sputtered platinum catalyst with pure hydrogen and oxygen fuel cells at 22 degrees centigrade and room pressures of 0.76 Bar with the etched particle track substrate fuel cells, and 1 N phosphoric acid (U.S. Pat. No. 4,673,624). The high platinum utilization occurred for the cell output of 0.4 volts. With a $14/gram platinum cost, this translates into a catalyst cost of $7.4 per kilowatt of power capacity. The conclusions from these experiments was that platinum utilizations may be pushed out to where it is no longer an economic limit to fuel cells in many product applications. This conclusion was drawn in the context that the current prices of energy products typically range from $10 a kilowatt in automotive systems to $10,000 a watt for miniature electronics. Other researchers have achieved similar platinum utilizations of 10 kW/gm (just the cathode), at more conventional parameters of 3 amps per square cm, 0.5 Volts, reactant pressures of 3 atmospheres hydrogen, 5 atmosphere of oxygen, 80 degrees centigrade, using NAFION™ perfluorinated ion exchange polymer electrolyte (Du Pont Company, Wilmington Delaware, Del. 19898) (Derouin, 1992). Another example of high platinum utilization is 12.4 kW/gm for the reactant conditions of 3 atmospheres hydrogen, 5 atmosphere of oxygen, 80 degrees centigrade, using a DOWN™ proton conductive polymer electrolyte, in U.S. Pat. No. 5,234,777. Although the operating conditions of these examples of other researchers are far from our target of ambient conditions operation, the conclusion is that high platinum utilizations have been achieved and by coupling these fuel cells with a safe, reliable, portable hydrogen generator a plethora of electrical energy consuming products may be created with this new energy source.

The MICRO-FUEL CELL™ power pack incorporates these new features into a fuel cell package that may reach the small power supply market.

These and further and other objects and features of the invention are apparent in the disclosure, which includes the above and ongoing written specification, with the claims and the drawings.

BRIEF DESCRIPTION OF THE DRAWINGS

FIG. 8a shows a Separated Component Storage System.

FIG. 8b shows the Separated Component Storage System with Rod Catalyst Surface Showing Needle Insertion.

DETAILED DESCRIPTION OF THE PREFERRED EMBODIMENTS

Figure 1:
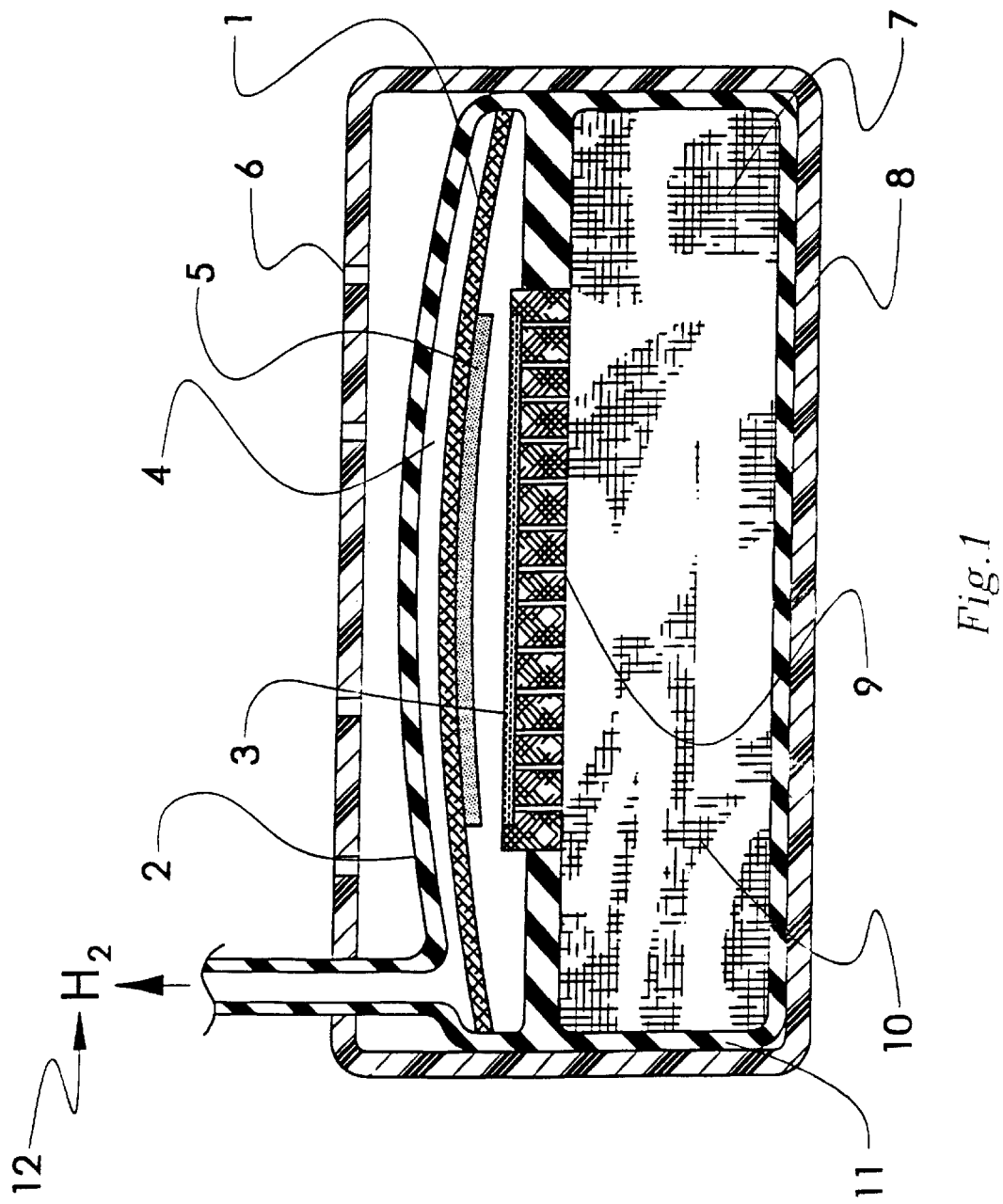
FIG. 1 shows a Diaphragm Generator.

In FIG. 1 a cross section of a diaphragm generator is shown. This system has fuel ($NaBH_4+NaOH+H_2O$) 7 held in a wicking material 10 and contained by a fuel tank 11 made of a material such as polyvinylchloride (PVC) plastic. The wicked fuel is bounded by a porous hydrophilic membrane 9 that the fuel preferentially wicks to and wets the outer fuel wetting surface 3. The preferential wicking is done by having a gradient of capillary pressure with the highest pressure at the surface of the fuel wetting surface 3.

Production of hydrogen is initiated by the catalyst coated surface 5 making contact with the fuel-wetted surface 3 when the internal pressure is low. The produced hydrogen 12 bubbles entrain partially used fuel 7 and move laterally to the sides of the fuel-wetted surface 3. The hydrogen gas 12 separates from the fuel 7 and is reabsorbed into the fuel wetted surface 3 and wicking material 10. This production lateral movement and re-absorption of the fuel 7 achieves a circulation of the fuel 7

The catalyst-coated surface 5 is attached to the hydrophobic porous membrane or molecular filter membrane 1. This membrane may range from a hydrophobic porous membrane to a molecular diffusion membrane such as silicone rubber or a pore free Pt/Ag film coating a corrugated porous backing membrane. The catalyst surface 5 may have a high surface area catalyst such as sputter deposited ruthenium onto the surface of a material such as VersaPore™ or PBO (full name) felt.

Membrane 1 is elastic and when the pressure is high pulls the catalyst-coated surface 5 away from the fuel-wetted surface 3. To accommodate the movement of the filter membrane 1 and flexible diaphragm 2 without changing the protective case 8, air vent perforation holes 6 are made in the protective case 8. To provide a gas manifold movement of hydrogen gas 12 being produced a gas plenum chamber 4 is formed between the flexible diaphragm 2 and the membrane filter 1.

Figure 2:
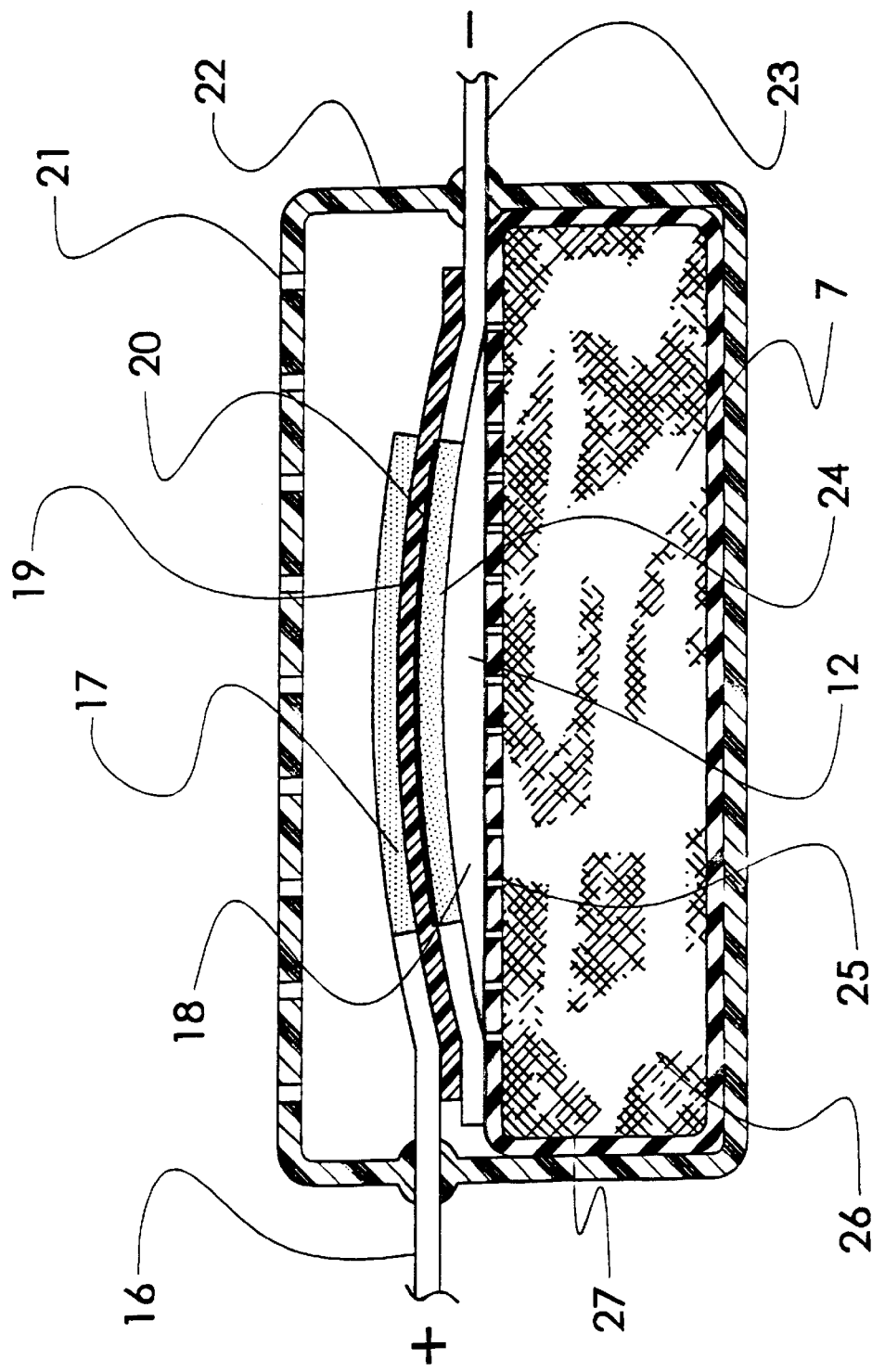
FIG. 2 shows a combination of the Diaphragm Generator and a Fuel Cell.

In FIG. 2 the diaphragm generator and fuel cell combination are shown in cross section. In this system a fuel cell or fuel cell array are combined with the hydrogen generator. The fuel 7 is contained within a wicking material 26. The wicking material 26 is contained within a fuel tank 27 that has a hydrophilic membrane and filter wall 25. The membrane and filter wall 25, by having small pores and being hydrophilic, preferentially wick the fuel 7 to the surface of the hydrogen fuel bubbling area 18. Upon start-up with no hydrogen in the hydrogen fuel bubbling area 18, the fuel electrode 24 of the membrane fuel cell 24, 20,19, 17 elastically relaxes and touches down onto the hydrophilic wetted fuel membranes 25 to generate hydrogen gas.

The membrane fuel cell 24, 20,19,17 may be made to press onto the hydrophilic membrane and filter 25 by several mechanisms. The first is to back the fuel cell with an elastic material such as silicone rubber on the air electrode side 17. The air electrode 17 may be backed with a springy open cell urethane foam to keep a uniform pressure on the air electrode 17 without cutting off the oxygen diffusion to the electrode. Another approach is to make the wicking material 26 springy and press against the fuel electrode.

In all these cases the fuel cell 24, 20,19, 17 may be mounted to the protective case 22 elastic enough to accommodate the expansion and contraction of the hydrogen volume in the hydrogen bubbling area 18. The protective case 22 is perforated 21 to accommodate the expansion and contraction and provide sufficient air diffusion to the air electrode 17. The mechanism to be achieved is to have the fuel electrode 24 make contact with the fuel 7 when the pressure is low and break contact with an intervening bubble of hydrogen in the bubble area 18 when the pressure is high. The fuel cell is a membrane type construction that has catalyst coated fuel electrode 24 and an air electrode 17 deposited onto a porous dielectric impregnated with electrolyte substrate 19 with metal hydride barrier layers 20 on the porous dielectric 19. The electrical output of the fuel cell 17, 19, 20,24 cell or array of printed series cells is collected on electrodes, the positive current collector electrode 16 collecting current from the air electrode 17 and the negative current collector electrode 23.

The barrier layer 20 made of metals such as 77% palladium and 23% silver alloy that only allows atomic hydrogen diffusion through is used in this cell advantageously over just having a polymer electrolyte NAFION™ (DuPont) or the fuel's 7 electrolyte of NaOH and water within the porous dielectric 19 separator because it reduces the diffusion leakage of the hydrogen gas 12, and it controls the position of the electrolyte. The barrier layer 20 prevents water from being transported throughout the fuel cell 17, 19, 20, 24 to either dilute the fuel in high humidity conditions or dehydrate in low humidity conditions in the air.

The electrolyte on the surface of the air electrode 17 is a small quantity to ensure that expansion and contraction of the electrolyte volume may not cause a significant change in position in the porous air electrode 17. This is important to maintain steady performance by keeping the electrolyte catalyst contact area constant through the range of conditions that the electrolyte is exposed to. The barrier layer 20 also serves the purpose of preventing carbon dioxide from the air diffusing into the fuel 7 and forming insoluble carbonates. Carbonates can clog the fuel electrode surface and gradually neutralize the base in the fuel. The barrier layer 20 may also work as a hydrogen hydride reservoir of fuel to give the fuel cell fast electrical response. This design is shown with the fuel cell running on the hydrogen produced by the fuel 7 decomposing on the fuel electrode catalysts.

An alternative route is to electrochemically remove the electrons and hydrogen from the fuel directly on the electrodes 24 without going to gaseous hydrogen. The mechanical separation feature of separating the fuel electrode 24 and the hydrophilic membrane surface 25 may still act as a shut off mechanism. Other safety and storage features may be to have an air seal cover over the air perforations to prevent contamination of the air electrode 19 and operation of the cell and to incorporate separate storage of wet and dry fuel components until use in the fuel tank. This feature is described further in the embodiment exemplified in FIGS. 7a, 7b, 8a and 8b.

Figure 3:
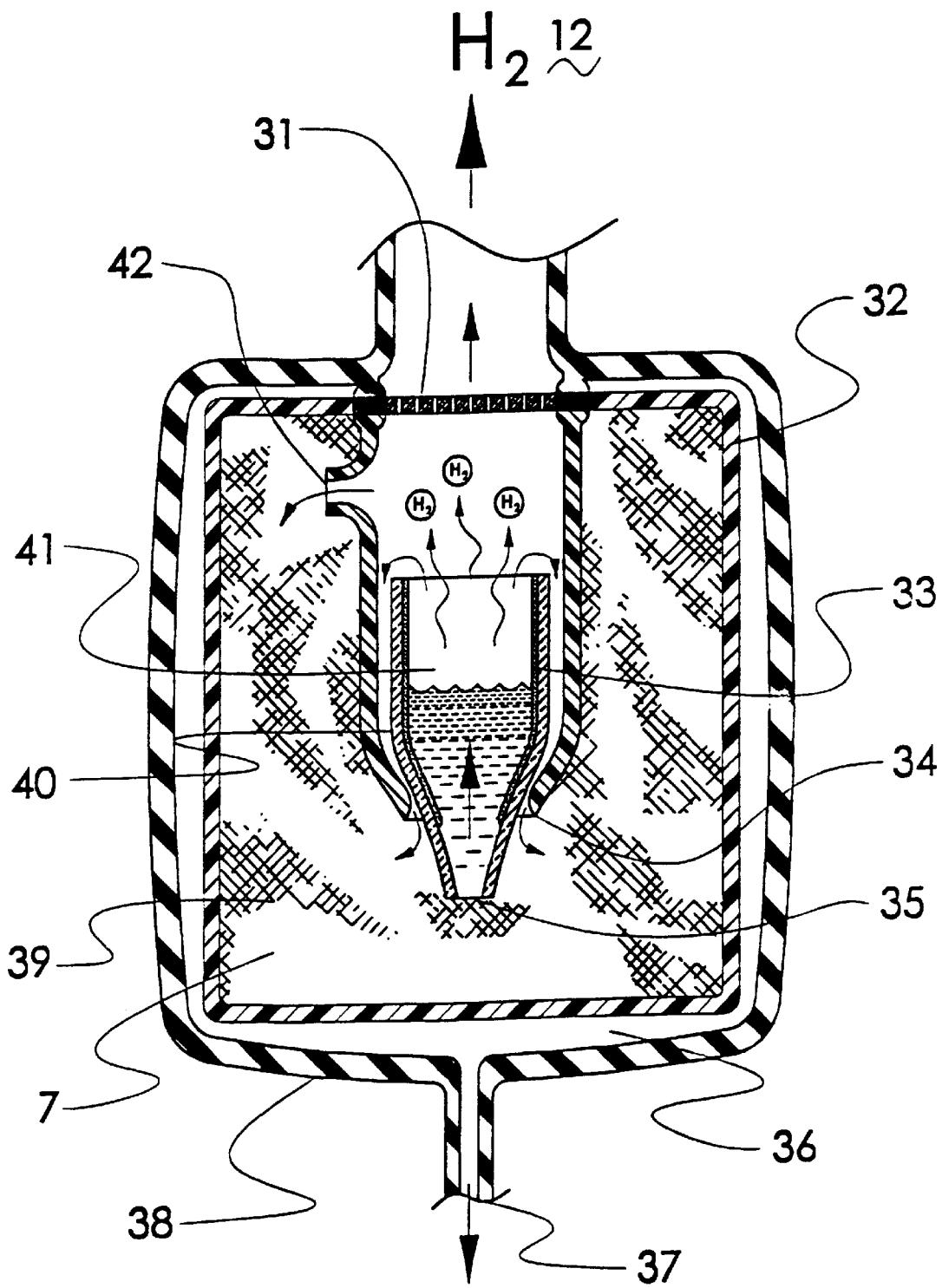
FIG. 3 shows a Percolator Generator.

In FIG. 3 a percolation generator with a wicked fuel supply is shown in cross section. In this system the narrow capillary entrance 35 wets with fuel and then hydrolyzes on contact with catalyst coating 33 in the reaction zone 41. The hydrogen production in the reaction zone 41 causes bubbles to form, entrapping the fuel 7 and subsequently pumping the fuel 7 up the diverging capillary tube 40. This pumping action then drives the fuel up the reaction zone 41 to further hydrolyze the fuel 7 and push the spent fuel 7 beyond the reaction zone 41 to the narrow capillary exit 35 or side capillary vents 42. The hydrogen gas 12 separates from the fuel 7 in the larger diameter of the reaction capillary tube 40.

The hydrogen gas 12 is filtered from the fuel 7 by a filter 31. Suitable materials for this filter 31 are expanded Teflon filters and hydrophobic felts. The filter 31 may be designed in layers to have hydrophilic routes that remove the liquid to the narrow capillary exits 34. The returning and expended fuel 7 from the capillary exits 34 and 42 are wicked back into the fuel wicking material 39. This device pressure regulates its production of hydrogen 12 such that when the hydrogen pressure is low the elastic container squeezes on the porous hydrophobic liner 32. This in turn compresses the wicking material 39 and fuel is pushed into the narrow capillary entrance 35. Subsequently the fuel hydrolysis commences on the catalytic surfaces 33 and hydrogen 12 is produced. The production of hydrogen raises the pressure on the interior of the elastic flexible container 38 and it expands, drawing the fuel back out of the reaction flask 40 and slowing or stopping the hydrolysis reaction on the reaction zone 41.

In this particular design the porous hydrophobic liner 32 is shown as a membrane but it may be a hydrophobic matrix that makes continuous contact with the elastic chamber 38. The purpose of this liner is to provide a mechanism whereby hydrogen gas may fill the voids 36 left in the wicking material 39 and preferentially keep the fuel 7 in contact with the capillary entrance 35 as the fuel is expended. The voids 36 may also have the function of a conduit of excess hydrogen production that may be vented out of a gas pressure vent 37. The gas pressure vent also serves the purpose that if this system is running on capillary pressure, driving the pressure of the produced hydrogen 12 the pressure of the void 36 may be set by the exterior pressure outside of the vent 37. The hydrogen filter 31 may also set the delivery rate and pressure depending on its throughput properties. There may be a capillary wetting zone that must exceed the capillary pressure to be exceeded before hydrogen gas can go through.

Figure 4:
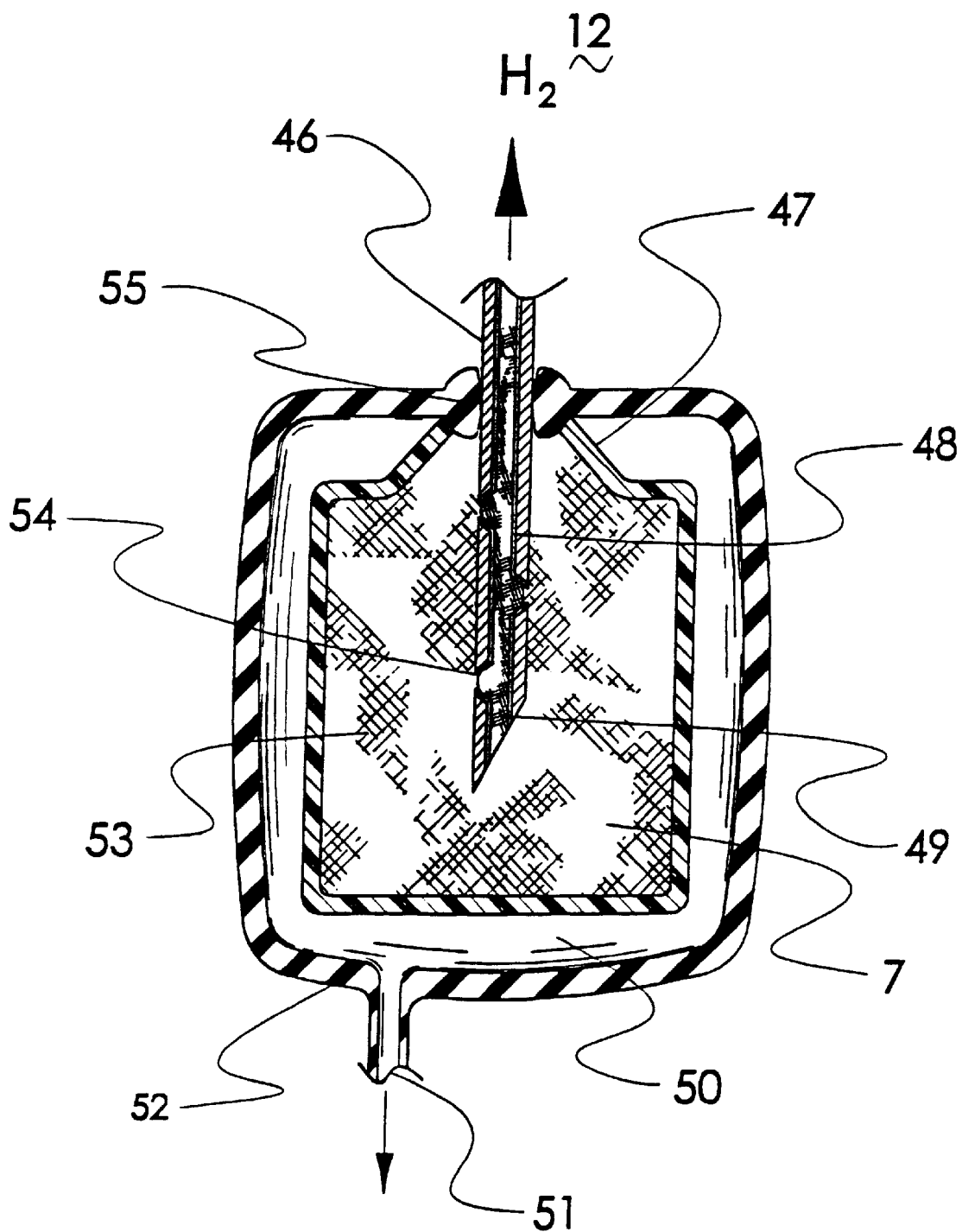
FIG. 4 shows a Needle and Bladder Generator.

In FIG. 4 a capillary needle and bladder generator is shown in cross section. In this embodiment the fuel 7 is contained in a wicking material 53 and puncture needle 46 is inserted into the wicked fuel 53 making a gas tight seal through a septum 55. The needle 46 has an interior capillary pore coated with catalytic surface 48 such as a coating of Ru metal.

The puncture needle 46 has a hydrophobic liner or coating in the interior of the diameter to filter liquid fuel from the hydrogen product 12. The puncture needle 46 has small cone shaped pores 54 that acts as capillary wicks to draw fuel 7 on the catalyst coated surfaces 48 of the puncture needle 46. When the fuel makes contact with the catalytic surfaces 48, hydrolysis occurs and hydrogen gas 12 entrains fuel 7 and is pumped out the largest diameter of the puncture needle 12. The hydrogen gas 12 is separated from the fuel, filtered via the hydrophobic filler 49 inside the puncture needle 46, and exits out the inside of the puncture needle 46. Excess hydrogen 7 may form a bubble at the tip of the puncture needle 46 at the inside of the wicking material 53, and act as a hydrogen reservoir.

Surrounding the wicking material 53 is a hydrophobic liner or zone 47 in the wicking material, which acts as a boundary to the lost fuel void 50. In the event that excess hydrogen 7 is produced, it may travel along the lost fuel void 50 and be vented out a flap valve through a pressure vent 51. The pressure vent 51 may be attached to a reference pressure and the hydrogen generation exceeds that pressure by the capillary pressure of the fuel 7 in the puncture needle 46. An alternative mode of operation is to have the fuel 7 in the wicking material 53 contained in a flexible container 52. When the pressure is low the wicking material 53 is compressed and the fuel 7 is forced into the puncture needle 46. Subsequent gas generation pressurizes the flexible container 52, which leads to expanding the flexible container 52 and the wicking material 52 drawing the fuel 7 out of the puncture needle 46.

Figure 5:
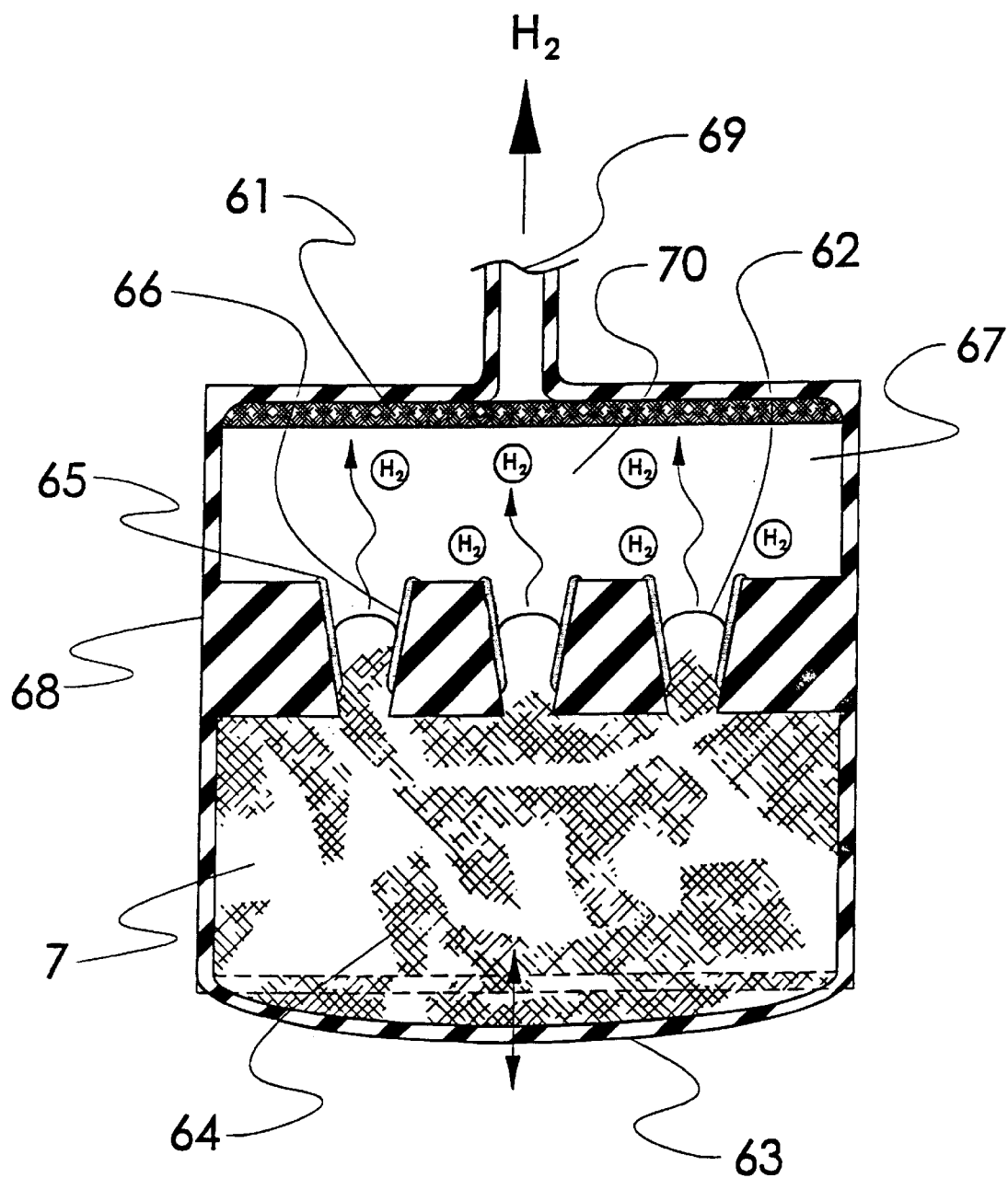
FIG. 5 shows a Single Stage Membrane Reactor.

In FIG. 5 a single stage membrane reactor is shown in cross section. In this system the fuel 7 is contained in a wicking material 64 in liquid contact with cone shaped catalyst coated pores 66. These catalyst coated pores 66 are built into a membrane that separates the hydrogen filled gas cavity 67. The Ru catalyst 65 coated pores 66 may be designed to have an entrance capillary pressure at the small diameter end in contact with the fuel impregnated wick 64 that determines the equilibrium pressure of the hydrogen generation.

If the capillary pressure is high the fuel 7 wicks into the pores 66 and the pressure of the generated hydrogen 12 may be high. If the capillary pressure achieved by coating the pore 66 with a hydrophobic coating such as TEFLON is low, the pressure in the hydrogen gas cavity may be low and it may take more hydrostatic pressure from the expandable diaphragm 63 pressing on the wick 64 to start and maintain the hydrogen generation. The catalyst coated pores 65 are incorporated into a membrane that separates the wicked fuel 7 and the hydrogen cavity 67.

Produced hydrogen is filtered by a filter 61 that passes only hydrogen gas 7. The hydrogen gas 7 exits through a hose 69 out of the other side of the container 68. In operation, when the hydrogen gas pressure is low, the fuel 7 makes liquid contact with the catalyst 65 coated pores 66. Hydrolyzation occurs and entrains fuel 62. The entrained fuel 62 bubbles out of the catalyst coated pores 65. The expended fuel 7 may fill up in the hydrogen gas cavity 67 or cycle back to the fuel wick 64. The hydrogen gas cavity may have a wicking or liquid absorbing material 70 in it to absorb spent fuel. The liquid absorbing material 70 may also have features of gradually neutralizing the typically basic fuel and finishing the hydrolization or have a catalyst dispersed throughout to complete the hydrolyzation.

Figure 6:
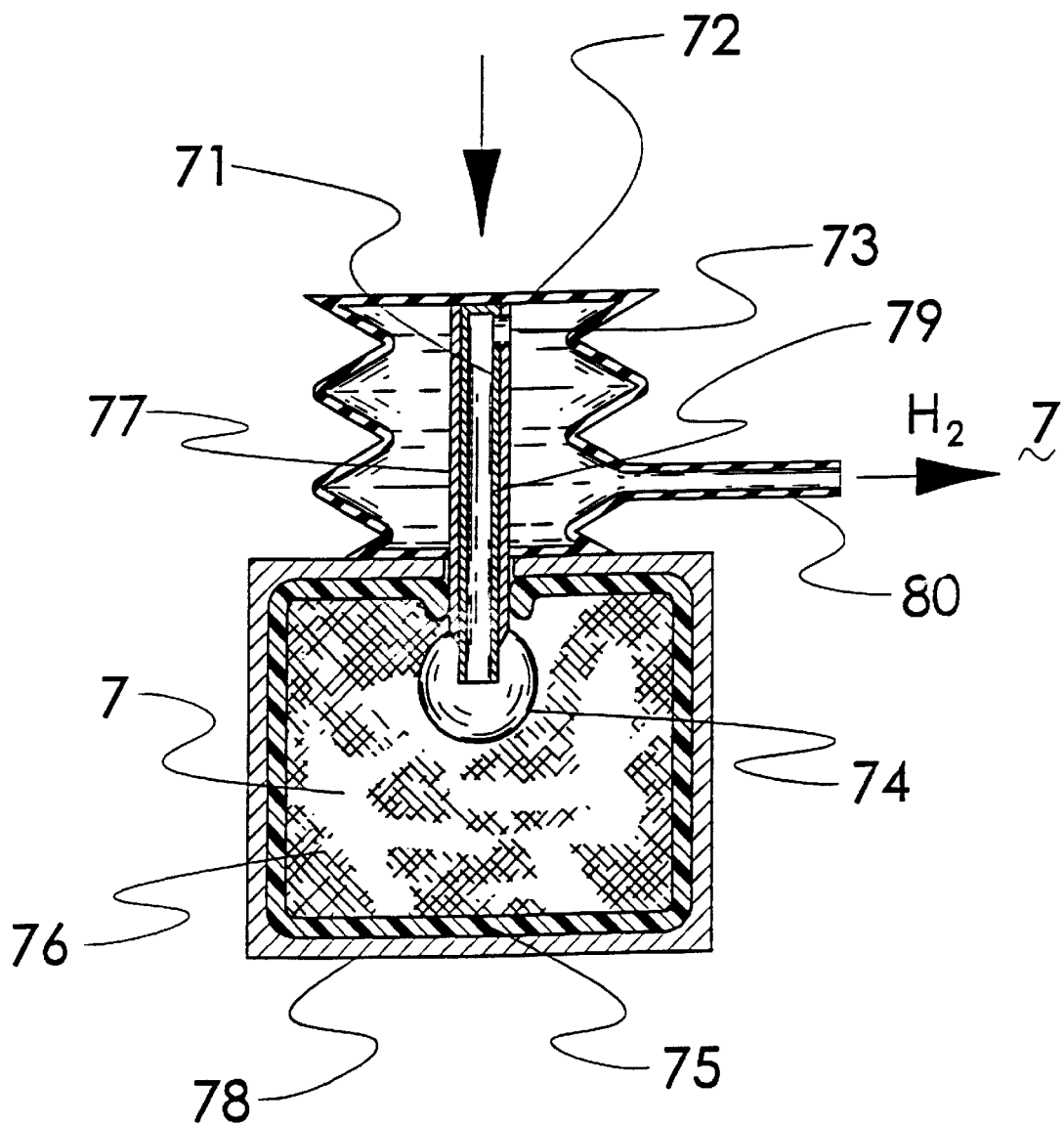
FIG. 6 shows a Mechanical Regulator.

In FIG. 6 a mechanical pressure regulation of catalyst to fuel contact is shown. In this scheme a bellows 72 is attached to the fuel tank 78. A hollow needle 79 is attached to the bellows 72. The hollow needle's interior is coated with a hydrophobic coating or liner 71. The exterior of the hollow needle 79 is coated with Ru or other catalysts. The hollow needle makes a seal on the hydrophilic liner 75 of the fuel tank 78. The hydrophilic liner surrounds the wicking material 76 which is impregnated with fuel 7.

The hollow needle has exit ports 73 at the top of the needle 78 to exit hydrogen gas 7. The hydrogen exits from the bellows by an exit tube 80. When the hydrogen pressure is low the bellows 72 contracts and pushes the hollow needle into the wicking material. Contact is made between the catalyst coating 77 and the fuel 7 in proportion to the contraction of the bellows. As hydrolysis occurs, hydrogen is generated and forms a bubble 74 of hydrogen gas around the end of the hollow needle 79. The hydrogen gas is separated from the fuel in the bubble 74 at the end of the hollow needle 79 and goes up the hydrophobic interior of the needle 71. The hydrogen then pressurizes the bellows 72 or exits the bellows. The pressurization of the bellows causes the bellows to expand and reduce or remove the contact of the catalytic surfaces from the fuel 7. In this way a pressure regulated hydrogen stream may be created.

Figure 7A:
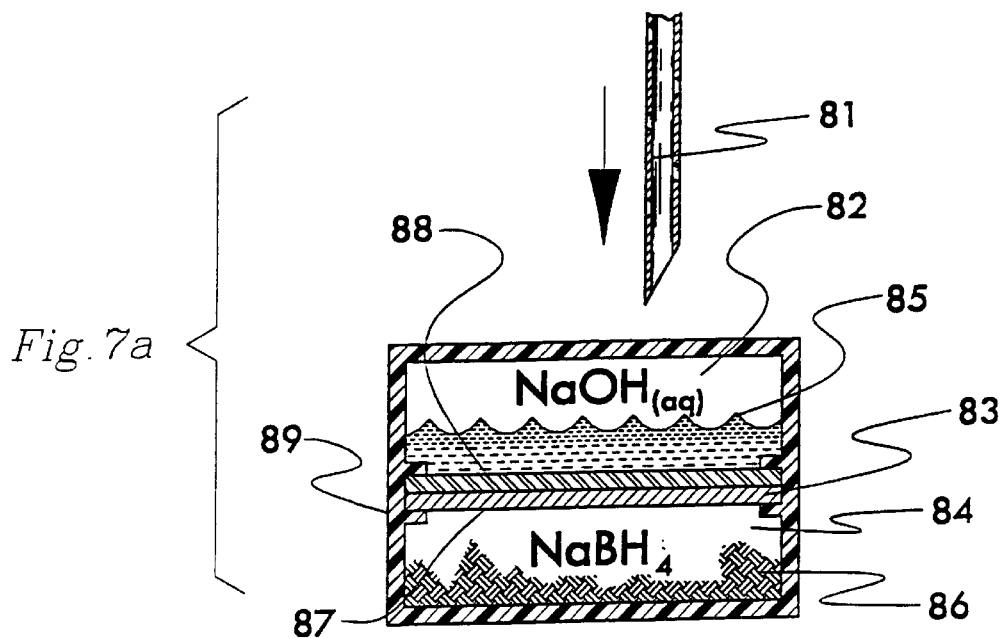
FIG. 7a shows a Separated Component Storage System.

In FIG. 7a a system of storing wet and dry fuel components separately is shown in a cross sectional view. The general concept is that the fuels may have a decomposition rate that gradually removes hydrogen from the fuel. This is especially a problem when the fuel is stored at elevated temperatures. The hydrogen generator when fueled slowly generates hydrogen supply resulting in a storage loss. To avoid this energy loss during storage the fuel reactants may be stored as dry ingredients and avoid decomposition. To accomplish this a solution of NaOH and water is stored in one container with a plastic coated membrane such as aluminum foil 87 coated with a thin film 88 of polyethylene separating them. The aluminum side 87 faces dry $NaBH_4$ and the polyethylene 88 faces the NaOH solution.

The membrane may be made of two materials such that when in contact with their respective fuel components are inert, but when in contact with the mixture of fuel components decompose. When the separation membrane is breached, the membrane dissolves, or the effect of the contact with the mixture or loss of one of the components mechanically tears the membrane apart. This system consists of a fuel tank container 89, a dry powder cavity 84 with dry powder 86, a separation membrane 83, a liquid components cavity 82 filed with the liquid components 85. To activate and run this system a surface catalyst coated needle 81 punctures and makes a seal on the fuel tank container 89. The needle breaches 91 the membrane as shown in FIG. 7b resulting in mixing the fuel components 85 and 86.

Figure 7B:
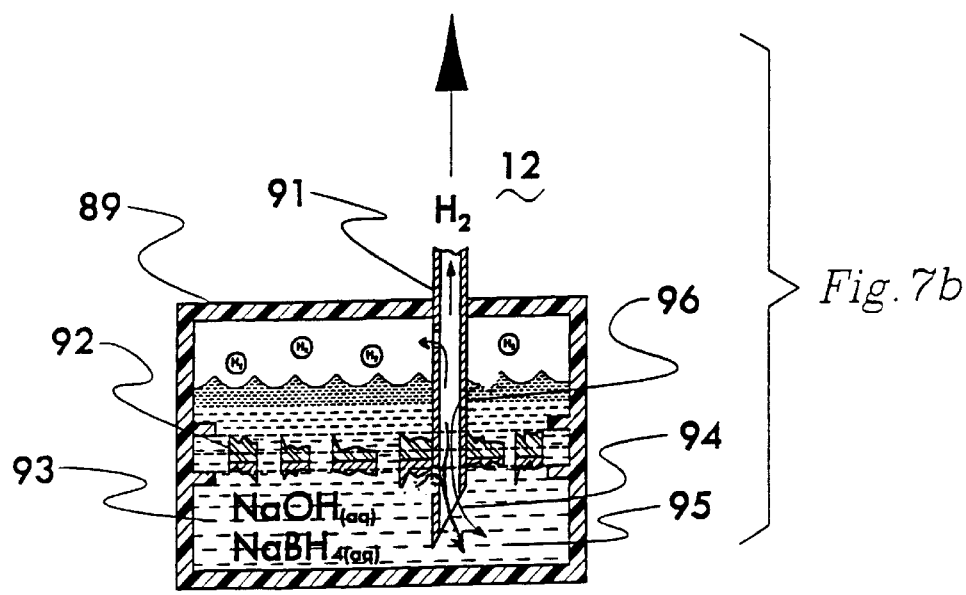
FIG. 7b shows the Separated Component Storage System Showing Needle Insertion.

In FIG. 7b the fuel components 85 and 86 mix and dissolve or react with the barrier layer 83. The fuel mixes through the barrier layer 92. Variations on this theme are to have a dry wicking material 95 in the dry components 86 that swell up on contact with the liquid to immobilize the fuel 93 and mechanically breach the barrier membrane 83.

The wicking material 95 may also be mechanically compressed and held back by the mechanical strength of the breach barrier 83, so that upon subsequent etching away 92 it loses mechanical strength and completely breaches letting the wicking material fill the entire fuel tank 89. The hollow catalyst needle operates as a percolator as in FIG. 4. The percolation steps are that fuel 93 is drawn into the needle 91 by hydrophilic pores 96, hydrolyzation entraining fuel 93 occurs, separation of the produced hydrogen 12 from the fuel 93 occurs in the needle 91, and circulating the fuel 94 back to the fuel tank 89.

In FIG. 8a and FIG. 8b the same scheme as in FIG. 7a and FIG. 7b is shown except that a Ru catalyst coated rod 100 is placed inside the hollow needle 101. The catalyst-coated rod may have a hydrophilic Ru catalyst coating and then non-catalytic hydrophobic section 100 of the rod the outlet end of the puncture needle 101. This system consists of a fuel tank container 89, surrounding a dry powder cavity 84 with dry powder 86, a separation membrane 83, a liquid components cavity 82 filled with the liquid components 85. To activate and run this system a needle 101 containing a catalyst coated rod or wire 81 punctures and makes a seal on the fuel tank container 89. The needle breaches 91 the membrane 88, 87 as shown in FIG. 8b and causes it to mix 92 the fuel components 85 and 86.

In FIG. 8b the fuel components 85 and 86 mix and dissolve or react with the barrier layer 83. The fuel mixes through the barrier layer 92. The fuel circulation draws fuel 93 up into the puncture needle 101. The fuel 93 hydrolyzes on contact with the Ru catalyst coated rod 100 to produce hydrogen bubbles that then coalesce in the hydrophobic zones 102 along the catalyst coated rod 100. Hydrogen gas 12 separates from the fuel 93 and exits out through the puncture needle 101. The spent fuel is wicked into the hydrophilic side pores 96 of the puncture needle to circulate 94 the fuel 93 back to the fuel wick 95.

Figure 9:
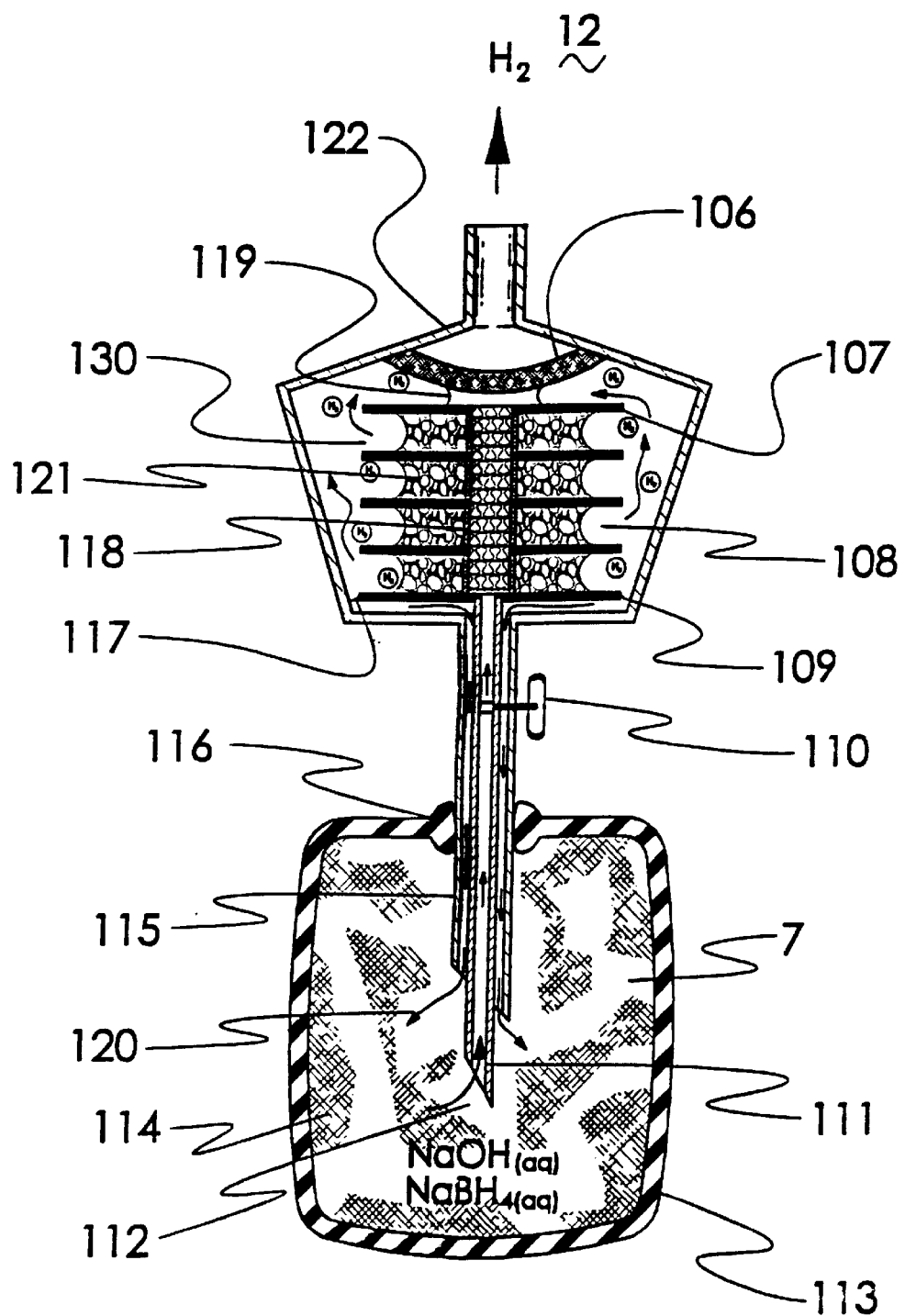
FIG. 9 a High Volume Percolator.

In FIG. 9 a high volume percolator scheme is shown in cross section. In this arrangement the fuel 7 is kept in a wicking material 114 inside a bladder 113. The bladder 113 elastically maintains a hydrostatic pressure on the fuel 7. The bladder 113 is breached by a puncture needle 111 and sealed to the bladder 113 by a septum 116. The puncture needle has concentric tubes that provide an inlet of fuel 112 and outlet of fuel 120.

A valve 110 is placed between the puncture needle 111 and the catalytic surfaces 107. This valve 110 may be a manual valve or regulated valve to control the output of the hydrogen generator. After the valve 110 a ballast screen 118 is packed into the entrance to the Ru coated surfaces 107 to provide a uniform resistance to the flow of fuel into the catalyst surfaces 107. The catalyst surfaces are arranged as a stack of rings with the inlet of the fuel 7 on the inside and the fuel hydrogen gas mixture 121 percolating out with radially diverging pores or channels 130. Hydrogen gas 12 and fuel are separated in the liquid gas separation zone 108. The liquid fuel 7 is drawn away by capillary action to the hydrophilic surface narrow gap 109 while the hydrogen gas bubble 121 coalesces and moves toward the hydrophobic filter. Liquid fuel 7 is shown wetting the small capillary return routes 119 and 117. Hydrogen gas 12 is filtered from fuel 7 by the filter 106 and exits out of the percolator container 122.

Figure 10:
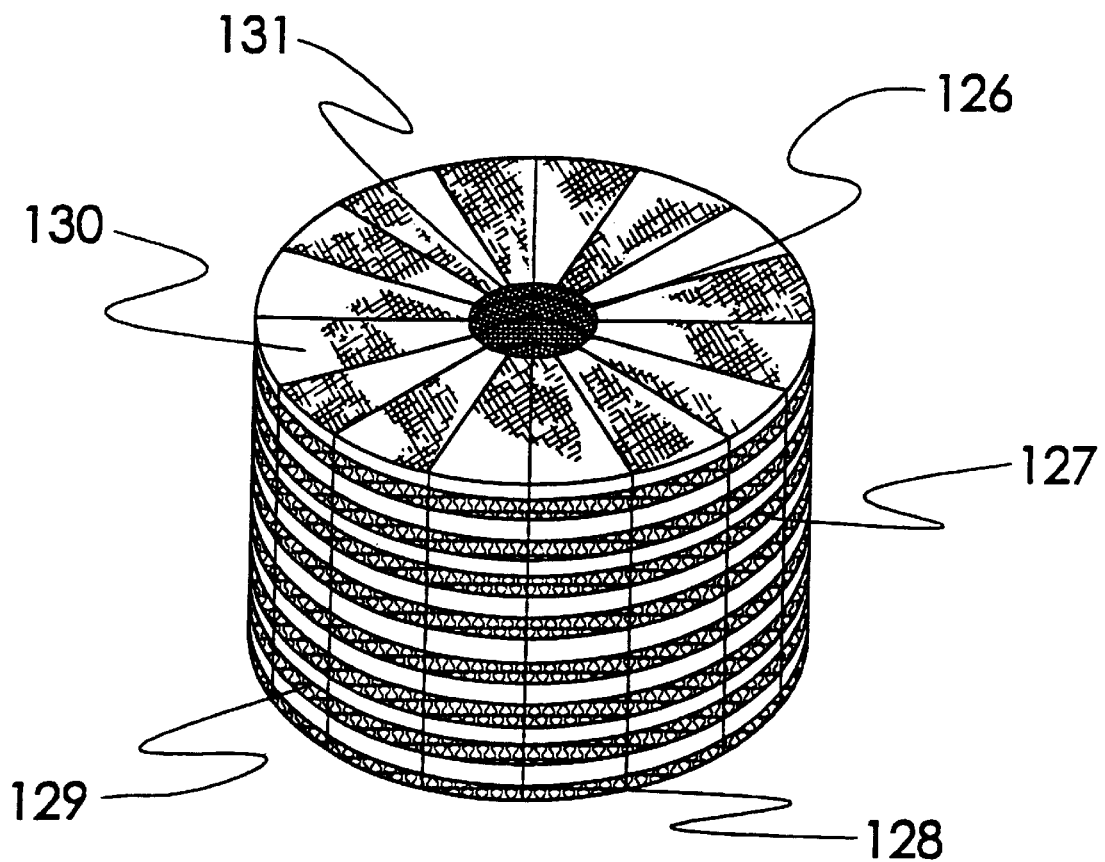
FIG. 10 shows a High Volume Radial Fan Reactor.

In FIG. 10 the high volume catalytic reactor is shown. This device is a stack of fluted or corrugated catalyst coated disks 128 with at central hole 126. They are stacked and aligned on a ballast screen 131 to provide centering and uniform resistance flow to the fuel going into the reactor. The ballast screen 131 may also have the property of being small with uniform hydrophilic pores that does not allow fuel bubbles to back up into the fuel entrance flow.

The surfaces of the reactor paper 128, such as VERSAPORE™ (Pall Specialty Materials, 25 Harbor Park Drive, Port Washington, N.Y. 11050) filter paper or PBO felts, have high surface areas to permit high reaction rates between the Ru catalyst and fuel 7. When the reactor is run, fuel enters from the central hole 126, goes through the ballast screen 131 and contacts the Ru catalyst surfaces 129. The fuel hydrolyzes on contact with the Ru catalysts 129 and generates hydrogen bubbles. The bubbles entrain fuel with them and coalesce 127 in the separation zone and expand out the radial divergent nozzle pattern 130 of the corrugated paper 128.

Figure 11:
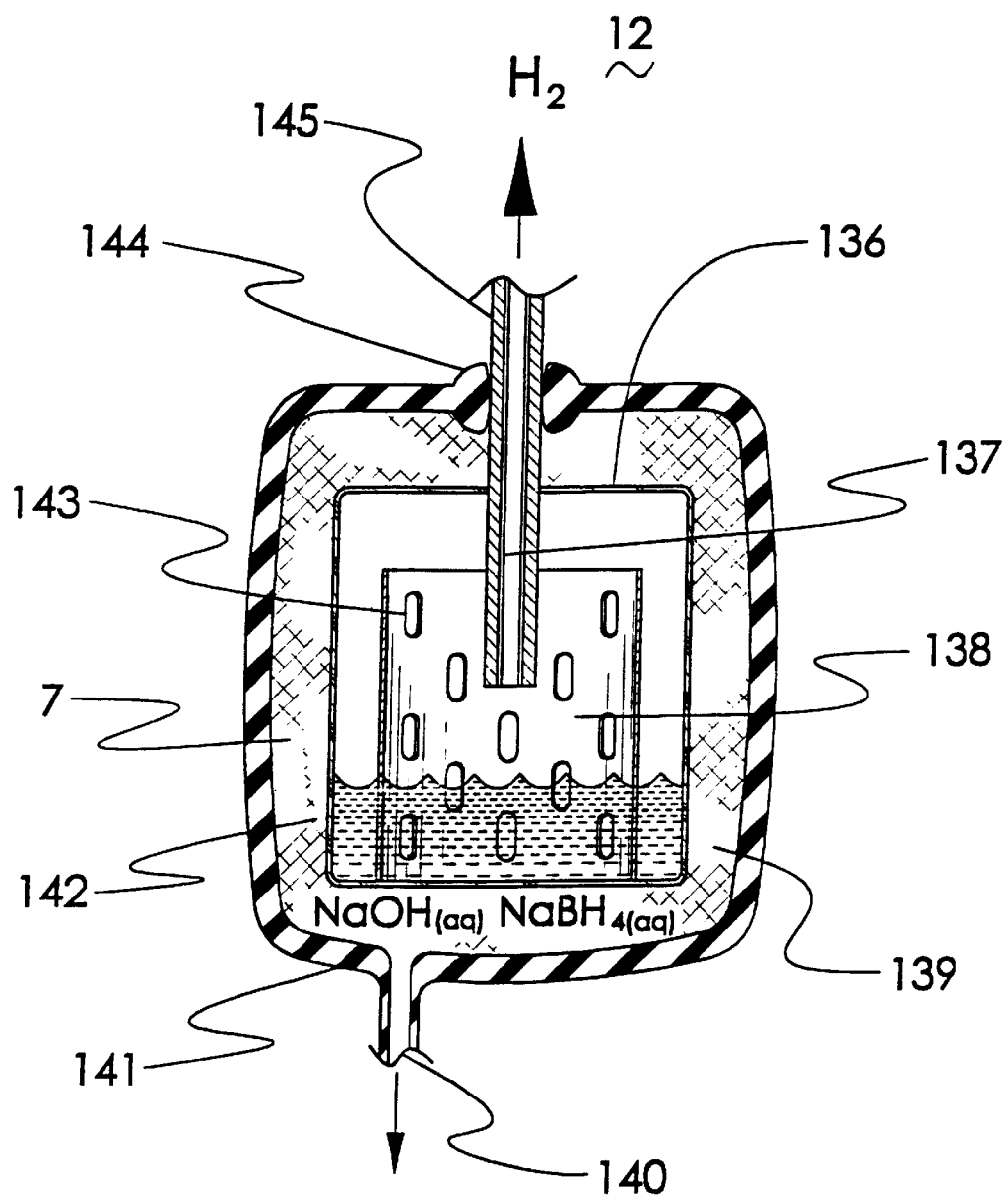
FIG. 11 shows a cross-section of a central collector reactor.

In FIG. 11 a central collector reactor is shown in cross section. In this scheme the product hydrogen 12 is collected from the center of the chamber by a hydrophobic tube 137. The catalytic surfaces 138 are on the inner surfaces and outer surfaces on a slotted tube or ring 143. Fuel 7 is held in a wicking material 142 at the walls of the flexible fuel container 141. The hollow puncture needle 145 is inserted and sealed to the wall of the flexible container 141 through a septum 144. Produced hydrogen gas 12 goes out through the hollow puncture needle 145. The inner part of the wicking material has a more hydrophilic liner 136 to keep the fuel 7 near the surface of the wicking material 142. Excessive gas pressure vents through a vent port 140. This design operates with the fuel saturated wick material 142 in the fuel chamber 139 being pressed onto the catalyst-coated tube 138 or sphere.

Wetting the catalytic surfaces with fuel produces hydrogen 12. The generated hydrogen 12 goes out of the hydrophobic exit tube 137, 145 when the generated hydrogen 12 fills over half the void inside the catalyst coated reactor. As more hydrogen 12 is generated it pressurizes the flexible container 141 and expands. This then causes the fuel 7 to be drained away from the catalyst-coated surfaces 138 and the production stops. As fuel is used the hydrophilic liner 136 keeps the available fuel close to the catalytic surfaces 138. In the low fuel condition hydrogen bubbles may fill voids in the fuel chamber 139 and along the walls of the flexible container 141. If excessive pressure buildup occurs, the wicking material 142 wicks up all the fuel and a vent route out through the pressure relief port 140 is clear. The vent valve may be simply a porous hydrophobic filter that once in contact with the gas vents through when it is above its capillary pressure. A flap valve may also be used.

While the invention has been described with reference to specific embodiments, modifications, and variations of the invention may be constructed without departing from the scope of the invention, which is defined in the following claims.

We claim:

1. A hydrogen generator comprising a fuel tank, a wicking material in the fuel tank, a fluid in the wicking material, a hydrophilic membrane bounding the wicking material for receiving the fluid from the wicking material by a wicking pressure, a surface proximal to the hydrophilic membrane, a catalyst on the surface, and hydrogen generated by hydrolyzation of the fluid contacting the catalyst due to reduced internal pressure.

2. The apparatus of claim 1, further comprising a first pressure regulation for controlling wicking of the fuel from the wicking material.

3. The apparatus of claim 2, further comprising a second pressure regulation providing capillary pressure and a third pressure regulation providing a generated hydrogen pressure for regulating generation of the hydrogen.

4. The apparatus of claim 1, further comprising a matrix and a reservoir for the fluid in the tank, and a capillary pressure gradient created by the matrix for circulating a bubbling fluid from the reservoir in the tank.

5. The apparatus of claim 4, wherein the matrix comprises a porous material having a pore diameter gradient for creating the capillary pressure gradient.

6. The apparatus of claim 1, further comprising tapered pores or channels in the tank and a capillary pressure gradient created by the tapered pores or channels.

7. The apparatus of claim 6, wherein the capillary pressure gradient created by the pores changes surface tension energy with geometric positioning of the fluid.

8. The apparatus of claim 1, further comprising capillary pressure in the tank for separating the hydrogen from the fluid.

9. The apparatus of claim 1, wherein the fluid comprises a chemical hydride in solution producing the hydrogen on contacting the catalyst.

10. The apparatus of claim 1, wherein the fluid comprises a solution of $NaBH_4+NaOH+H_2O$ and wherein the catalyst is Ru.

11. The apparatus of claim 1, wherein the fluid comprises a hydrocarbon and wherein the catalyst is a solid catalyst.

12. The apparatus of claim 1, wherein the fluid comprises a hydrocarbon and the catalyst is Pt and Ru.

13. The apparatus of claim 1, further comprising separate compartments for storing the fluid and the catalyst in a non-generating state and for mixing from the compartments when the hydrogen production is desired.

14. The apparatus of claim 13, further comprising a separation barrier between the compartments for breaching and contacting the fluid with the catalyst and for generating the hydrogen.

15. The apparatus of claim 1, wherein the catalyst comprises two electrodes for electrochemically acting on the fluid to produce the hydrogen.

16. The apparatus of claim 1, further comprising a thermoregulation device for heating the catalyst for increasing hydrogen production.

17. The apparatus of claim 16, wherein the thermoregulation is by an electrode in the catalyst electrically heated for increasing the hydrogen production.

18. The apparatus of claim 16, wherein the thermoregulation device is selected from a group consisting of a thermopile, diversion of exhaust, evaporative cooling, gas compression refrigerator, heat pump, resistance wire and combinations thereof.

19. The apparatus of claim 1, wherein the surface is an electrical resistance heated catalytic surface for increasing hydrolysis reaction rates, and a feedback mechanism in the tank for controlling electrical heating proportional to a load and for adjusting a production rate proportional to a need for the hydrogen.

20. The apparatus of claim 1, wherein the catalyst is a fuel cell electrode.

21. The apparatus of claim 20, wherein the fuel cell electrode is part of a fuel cell comprising a pore free hydrogen selective membrane.

22. The apparatus of claim 21, wherein the hydrogen selective membrane separates the fluid and the catalyst.

23. The apparatus of claim 20, wherein the fuel electrode is a metal hydride capable of storing hydrogen.

24. The apparatus of claim 20, wherein the fuel cell electrode comprises capillary pressure gradient electrodes for using bubbling of the fluid to circulate the hydrogen through the electrode.

25. The apparatus of claim 24, further comprising pressure of the hydrogen and capillary pressure, wherein the capillary pressure gradient electrodes prevent contact of the fluid with the fuel cell electrode when undesired.

26. The apparatus of claim 1, further comprising a selective gas permeable membrane for separating the hydrogen and the fluid.

27. The apparatus of claim 26, wherein the selective gas permeable membrane is more permeable to molecules of the hydrogen than to molecules of the fluid.

28. The apparatus of claim 27, wherein the selectively permeable membrane is a platinum coated palladium silver alloy film supported on a porous surface.

29. The apparatus of claim 1, further comprising a valve between the fluid and the catalyst.

30. The apparatus of claim 1, further comprising a pump between the fluid and the catalyst.

31. The apparatus of claim 1, where the wicking positions the fluid on the hydrophilic membrane after hydrolysis.

32. The apparatus of claim 1, wherein the wicking material comprises an absorbent material.

33. The apparatus of claim 1, wherein the wicking material comprises a neutralizing material for neutralizing spent fuel in the fluid.

34. The apparatus of claim 33, wherein the wicking material fully utilizes chemical energy in the fuel.

35. A hydrogen generation process comprising providing a fluid and a catalyst in a fuel tank, contacting the fluid and the catalyst, causing dehydrogenation of the fluid on contacting with the catalyst, generating hydrogen, coupling a pressure of the generated hydrogen to a mechanical means, causing bubble formation and capillary wetting for positioning the fluid.

36. The process of claim 35, further comprising regulating further generation of hydrogen using the pressure of the generated hydrogen.

37. The process of claim 35, wherein providing the catalyst comprises providing a fuel cell electrode.

38. The process of claim 35, wherein contacting the fluid and the catalyst comprises expanding and contracting the fuel tank to respectively press in contact or remove from contact the fluid and the catalyst in the tank.

* * * * *